Dec. 26, 1961 L. G. FREEMAN Re. 25,106
ADJUSTABLE LAMP
Original Filed April 20, 1959 2 Sheets-Sheet 1
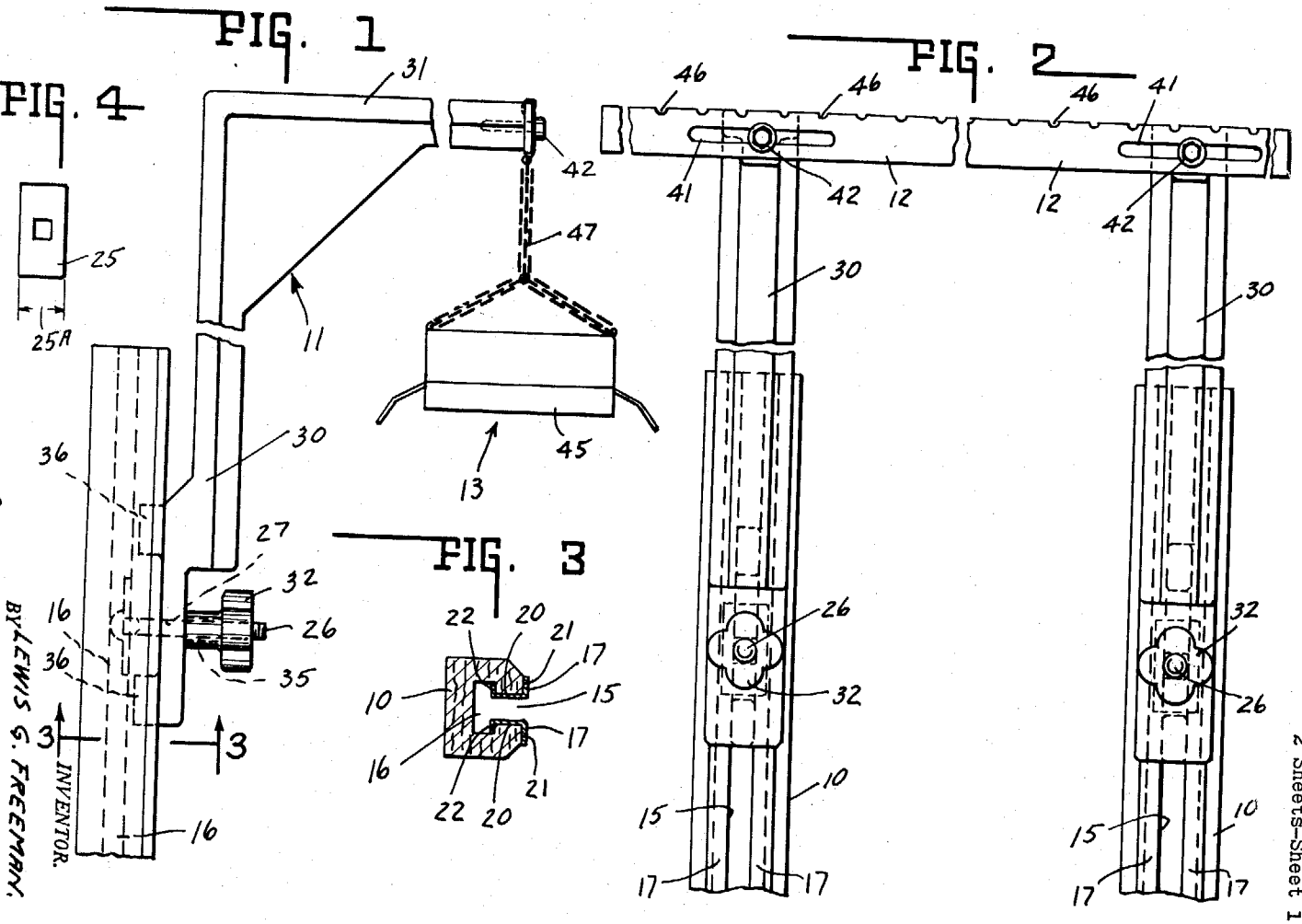
INVENTOR.
BY LEWIS G. FREEMAN.
Lockwood, Woodard, Smith & Weikart.
ATTORNEYS.

ADJUSTABLE LAMP
Original Filed April 20, 1959 2 Sheets-Sheet 2
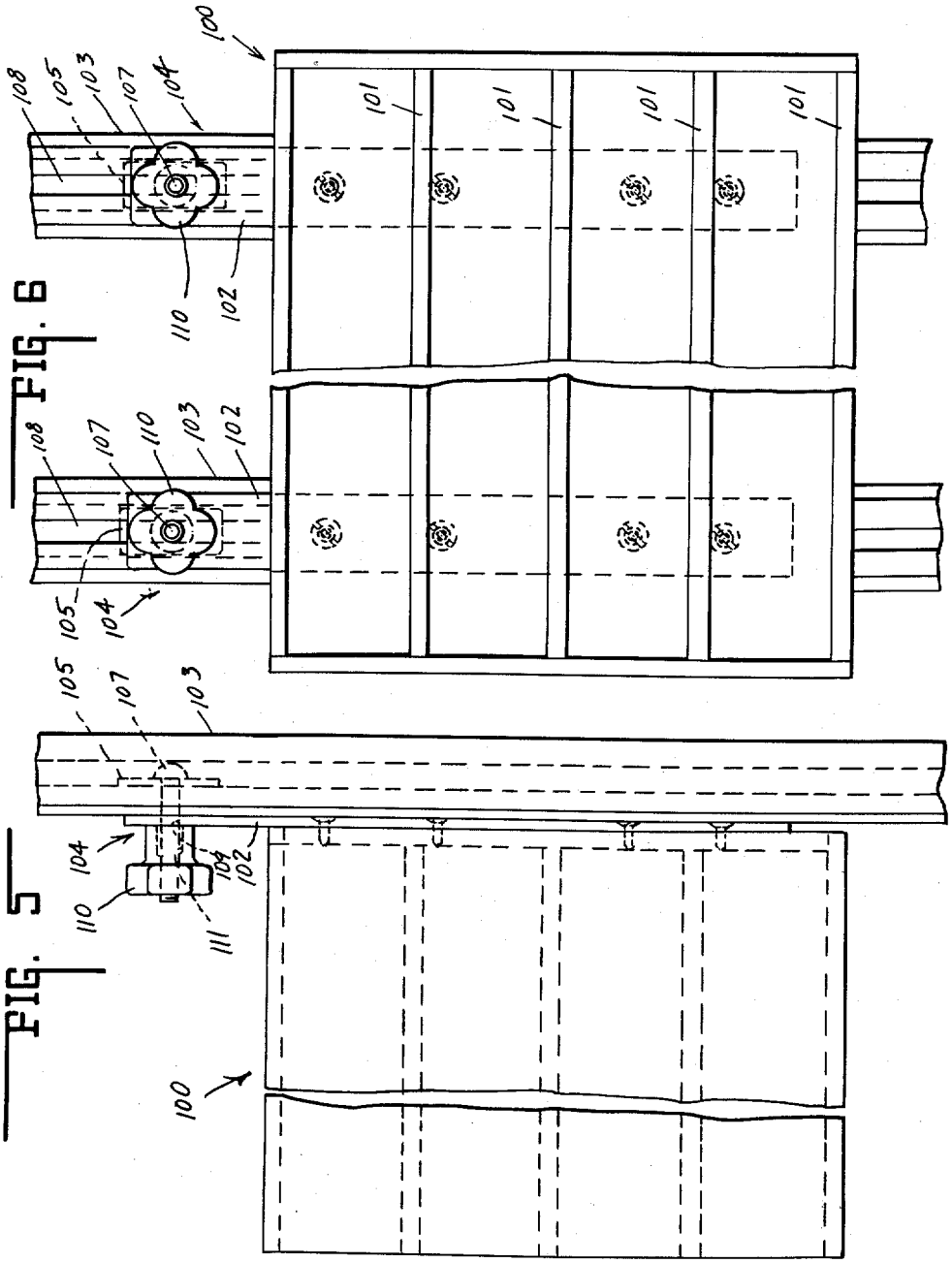
INVENTOR.
LEWIS G. FREEMAN.
BY
Lockwood, Woodard, Smith & Weikart.
ATTORNEYS.

United States Patent Office

Re. 25,106
Reissued Dec. 26, 1961

25,106
ADJUSTABLE LAMP

Lewis G. Freeman, R.R. 3, Kokomo, Ind.

Original No. 2,979,303, dated Apr. 11, 1961, Ser. No. 807,471, Apr. 20, 1959. Application for reissue June 23, 1961, Ser. No. 120,145
6 Claims. (Cl. 248—287)

Matter enclosed in heavy brackets [ ] appears in the original patent but forms no part of this reissue specification; matter printed in italics indicates the additions made by reissue.

The present invention relates to an adjustable lamp and also to a subcombination thereof, an adjustable mounting device.

It is an object of the present invention to provide an improved adjustable lamp.

It is a further object of the present invention to provide a lamp which is adjustable vertically and horizontally throughout a range of positions and is adjustable throughout a range of angles or attitudes.

Still another object of the present invention is to provide an improved mounting device.

Still a further object of the present invention is to provide a mounting device which provides a fixed support and which may be easily relocated to a new fixed position.

The full nature of the invention will be understood from the accompanying drawings and the following description and claims:

FIG. 1 is a side elevation of an adjustable lamp embodying the present invention.

FIG. 2 is a front elevation of the lamp of FIG. 1 with certain portions removed for clarity.

FIG. 3 is a section of an upright member forming a portion of the device of FIG. 1, taken in the direction of the arrows and along the line 3—3 of FIG. 1.

FIG. 4 is a detail front view of a washer forming a portion of the lamp of FIG. 1.

FIG. 5 is a side elevation of a hanging desk which incorporates the adjustable mounting device forming a portion of the present invention.

FIG. 6 is a front elevation of the desk of FIG. 5.

Referring now to the drawings, the lamp portion of my invention comprises, in general, a pair of upright members, indicated generally by the numerals 10—10 which are fixed by any suitable means in a spaced parallel relationship, a pair of mounting elements 11, each of which is adjustably mounted upon the respective one of the vertical members 10, an elongated bar 12 adjustably fixed to the mounting elements 11 and an elongated fluorescent electric light 13 hung from the bar 12. The lamp may be adjusted upwardly or downwardly by releasing the individual mounting elements 11 and by moving them upwardly or downwardly, respectively, and by retightening the mounting elements in the desired position. The electric light in the present device may be adjusted leftwardly or rightwardly by changing the location of the bar 12 upon the mounting elements 11. And the attitude or angle of the fluorescent light may be adjusted by adjusting one of the mounting elements 11 upwardly or downwardly with respect to other of the mounting elements.

Each vertical or upright member 10 has a hollowed-out interior 16 and a vertical slot 15 (FIG. 3) which communicates between the hollowed-out interior 16 and the outside of the vertical member 10. Each upright member 10 is provided with a pair of bearing members 17—17 (see FIG. 3) attached thereto and covering the walls 20 of the slot 15, the portion 22 of the hollowed-out interior 16 adjacent to the walls of the slot and the portion 21 of the outside of the upright member 10 adjacent to the walls of the slot 15.

A washer 25 having a transverse dimension 25A (see FIG. 4) greater than the transverse dimension of the slot 15 is received within the hollowed-out interior 16 of each upright member 10 and has seated therein a bolt 26. The threaded portion of each bolt 26 extends outwardly through the slot 15 and passes through an aperture 27 in a vertical or upright portion 30 of each mounting element 11, each of the mounting elements 11 being formed as an elbow with two mutually perpendicular portions, the vertical portion 30 and the horizontal portion 31.

A knob 32 having a screw threaded aperture 35 therein suitable for reception of the bolt 26 and of a sufficient size for easy manual gripping and rotating, functions to fix each mounting element 11 in any desired vertical position. A pair of rectangularly-shaped guides 36 project from each mounting element 11 into a respective one of the slots 15, are arranged on either side of the bolt 26 and function to maintain constant the attitude of each mounting element 11.

The elongated bar 12 has elongated slots 41—41 arranged longitudinally thereof and is fixed to mounting elements 11 by means of a pair of screws 42—42 which extend through the elongated slots 41 into suitably threaded apertures in the mounting elements 11. The bar 12 may be adjusted leftwardly or rightwardly by releasing the screws 42, moving the bar 12 leftwardly or rightwardly so that the slots 42 move relative to the screws 42 and by retightening the screws 42 with the bar 12 in the desired position. The elongated electric fluorescent light 45 is hung from the bar 12 by means of chains 47—47 received in notches 46—46.

From the above description it will be obvious that the light may be set at any desired height by releasing the knob 32, moving the mounting elements 11 to the desired height and by retightening the knobs 32 and it will also be obvious that the angle of inclination or attitude of the electric light may be adjusted as desired by moving either of the mounting elements 11 upwardly or downwardly with respect to the other of the mounting elements, taking care that the screws 42 are first released so that the bar can pivot relative to the screws.

Referring now to FIGS. 5 and 6, the desk itself 100 having shelves 101—101 is mounted upon vertical supports 102—102 which are secured to upright members 103—103 (which have the same C-shaped cross section as illustrated in FIG. 3) by means of adjustable mounting devices 104—104. A washer 105 similar to washer 25 is received within each hollowed-out interior 106 of the upright members 103 and has seated therein a bolt 107. The threaded portion of each bolt extends outwardly through slot 108 and passes through an aperture 109 in each vertical support 102. A knob 110, of a sufficient size for easy manual gripping and rotating, has a screw threaded aperture 111 for reception of bolt 107 and functions to fix each vertical support 102 in any desired vertical position.

It should be noted that the various parts of the present invention can be made from any suitable metal or other material.

While the invention has been disclosed and described in some detail in the drawings and foregoing description, they are to be considered as illustrative and not restrictive in character, as modifications may readily suggest themselves to persons skilled in this art and within the broad scope of the invention, reference being had to the appended claims.

The invention claimed is:

*1.* An adjustable lamp comprising a pair of upright wood members arranged in a spaced parallel relationship and each having a hollowed-out interior and a vertical slot communicating between said interior and the outside of the upright member, a pair of bearing members provided for each upright member, each of a respective pair of bearing members covering one of the walls forming one of said slots and the portion of the hollowed-out interior and the portion of the outside of the upright member adjacent to said slot, a washer having a transverse dimension larger than said slot received within each hollowed-out interior, a bolt seated in each washer and having its screw threaded portion extending through its respective slot outwardly of its respective upright member, a pair of mounting elements each having an aperture through which a respective one of said bolts pass, a pair of knobs each having a screw threaded aperture for reception on said bolts and for fixing said mounting elements against said bearing members whereby vertical adjustability of each mounting element is provided, each of said mounting elements being formed as an elbow having a pair of mutually perpendicular portions, one of which extends vertically upwardly and includes said mounting element aperture and the other of which projects horizontally from the most upward end of said vertical portion, an elongated bar having a pair of aligned slots therein arranged longitudinally of said bar, a pair of screws projecting through respective ones of said slots, each of said screws adjustably fixing said bar to the distal end of a respective one of the horizontal portions of said mounting elements, and an elongated electric light hung from said bar in parallel relationship therewith.

*2. An adjustable lamp comprising a pair of upright members arranged in a spaced parallel relationship and each having a hollowed-out interior and a vertical slot communicating between said interior and the outside of the upright member, a washer having a transverse dimension larger than said slot received within each hollowed-out interior, a bolt seated in each washer and having its screw threaded portion extending through its respective slot outwardly of its respective upright member, a pair of mounting elements each having an aperture through which a respective one of said bolts pass, a pair of knobs each having a screw threaded aperture for reception on said bolts and for fixing said mounting elements against said upright members whereby vertical adjustability of each mounting element is provided, each of said mounting elements being formed as an elbow having a pair of mutually perpendicular portions, one of which extends vertically upwardly and includes said mounting element aperture and the other of which projects horizontally from the most upward end of said vertical portion, an elongated bar having a pair of aligned slots therein arranged longitudinally of said bar, a pair of screws projecting through respective ones of said slots, each of said screws adjustably fixing said bar to the distal end of a respective one of the horizontal portions of said mounting elements, and an elongated electric light hung from said bar in parallel relationship therewith.*

*3. An adjustable lamp comprising a pair of upright members arranged in a spaced parallel relationship and each having a hollowed-out interior and a vertical slot communicating between said interior and the outside of the upright member, a bolt having a head received in each hollowed-out interior and having its screw threaded portion extending through its respective slot outwardly of its respective upright member, said bolt head having a transverse dimension larger than said slot, a pair of mounting elements each having an aperture through which a respective one of said bolts pass, a pair of knobs each having a screw threaded aperture for reception on said bolts and for fixing said mounting elements against said upright members whereby vertical adjustability of each mounting element is provided, each of said mounting elements being formed as an elbow having a pair of mutually perpendicular portions, one of which extends vertically upwardly and includes said mounting element aperture and the other of which projects horizontally, an elongated bar having a pair of aligned slots therein arranged longitudinally of said bar, a pair of screws projecting through respective ones of said slots, each of said screws adjustably fixing said bar to the distal end of a respective one of the horizontal portions of said mounting elements, and an elongated electric light hung from said bar in parallel relationship therewith.*

*4. An adjustable lamp comprising a pair of upright members arranged in a spaced parallel relationship and each having a hollowed-out interior and a vertical slot communicating between said interior and the outside of the upright member, a bolt having a head received in each hollowed-out interior and having its screw threaded portion extending through its respective slot outwardly of its respective upright member, said bolt head having a transverse dimension larger than said slot, a pair of mounting elements each having an aperture through which a respective one of said bolts pass, a pair of guides each projecting from a respective mounting element into a respective one of said slots for maintaining a constant attitude of each mounting element, a pair of knobs each having a screw threaded aperture for reception on said bolts and for fixing said mounting elements against said upright members whereby vertical adjustability of each mounting element is provided, each of said mounting elements being formed as an elbow having a pair of mutually perpendicular portions, one of which extends vertically upwardly and includes said mounting element aperture and the other of which projects horizontally, an elongated bar having a pair of aligned slots therein arranged longitudinally of said bar, a pair of screws projecting through respective ones of said slots, each of said screws adjustably fixing said bar to the distal end of a respective one of the horizontal portions of said mounting elements, and an elongated electric light hung from said bar in parallel relationship therewith.*

*5. An adjustable structure comprising a pair of upright members arranged in a spaced parallel relationship and each having a hollowed-out interior and a vertical slot communicating between said interior and the outside of the upright member, a washer having a transverse dimension larger than said slot received within each hollowed-out interior, a bolt seated in each washer and having its screw threaded portion extending through its respective slot outwardly of its respective upright member, a pair of mounting elements each having an aperture through which a respective one of said bolts pass, a pair of knobs each having a screw threaded aperture for reception on said bolts and for fixing said mounting elements against said upright members whereby vertical adjustability of each mounting element is provided, each of said mounting elements being formed as an elbow having a pair of mutually perpendicular portions, one of which extends vertically upwardly and includes said mounting element aperture and the other of which projects horizontally from the most upward end of said vertical portion, an elongated bar having a pair of aligned slots therein arranged longitudinally of said bar, and a pair of screws projecting through respective ones of said slots, each of said screws adjustably fixing said bar to the distal end of a respective one of the horizontal portions of said mounting elements.*

*6. An adjustable structure comprising a pair of upright members arranged in a spaced parallel relationship and each having a hollowed-out interior and a vertical slot communicating between said interior and the outside of the upright member, a bolt having a head received in each hollowed-out interior and having its screw threaded portion extending through its respective slot outwardly of its respective upright member, said bolt head having a transverse dimension larger than said slot, a pair of mounting elements each having an aperture through which a respective one of said bolts pass, a pair of knobs each having a screw threaded aperture for reception on said bolts and for fixing said mounting elements against said*

*upright members whereby vertical adjustability of each mounting element is provided, each of said mounting elements being formed as an elbow having a pair of mutually perpendicular portions, one of which extends vertically upwardly and includes said mounting element aperture and the other of which projects horizontally, an elongated bar having a pair of aligned slots therein arranged longitudinally of said bar, and a pair of screws projecting through respective ones of said slots, each of said screws adjustably fixing said bar to the distal end of a respective one of the horizontal portions of said mounting elements.*

References Cited in the file of this patent or the original patent

UNITED STATES PATENTS

| | | |
|---|---|---|
| 711,759 | Chmelitzek | Oct. 21, 1902 |
| 844,367 | Knape | Feb. 19, 1907 |
| 866,695 | Taussig | Sept. 24, 1907 |
| 952,184 | Carver | Mar. 15, 1910 |
| 1,466,122 | English | Aug. 28, 1923 |
| 2,737,268 | Smith | Mar. 6, 1956 |
| 2,876,978 | Robinson | Mar. 10, 1959 |